United States Patent [19]
Ohki

[11] Patent Number: 5,361,104
[45] Date of Patent: Nov. 1, 1994

[54] MOTION VECTOR DETECTION DEVICE

[75] Inventor: Mitsuharu Ohki, Tokyo, Japan

[73] Assignee: Sony Corporation, Tokyo, Japan

[21] Appl. No.: 904,579

[22] Filed: Jun. 26, 1992

[30] Foreign Application Priority Data

Jun. 28, 1991 [JP] Japan ................... 3-184061

[51] Int. Cl.[5] .............................................. H04N 7/13
[52] U.S. Cl. ..................................... 348/699; 348/416
[58] Field of Search ............... 358/105, 136; 348/699, 348/700, 701, 416, 413; H04N 7/13, 7/137

[56] References Cited
U.S. PATENT DOCUMENTS

| | | | |
|---|---|---|---|
| 4,677,476 | 6/1987 | Kondo | 358/105 |
| 4,777,530 | 10/1988 | Kondo | 358/105 |
| 4,984,074 | 1/1991 | Uomori et al. | 358/105 |
| 5,019,901 | 5/1991 | Uomori et al. | 358/105 |
| 5,047,850 | 9/1991 | Ishii et al. | 358/105 |
| 5,099,323 | 3/1992 | Morimura et al. | 358/105 |
| 5,111,511 | 5/1992 | Ishii et al. | 358/105 |
| 5,157,732 | 10/1992 | Ishii et al. | 358/136 |
| 5,172,226 | 12/1992 | Morimura et al. | 358/105 |

Primary Examiner—Tommy P. Chin
Assistant Examiner—Bryan S. Tung
Attorney, Agent, or Firm—Jay H. Maioli

[57] ABSTRACT

A motion vector detection device in which the absolute value of the difference between a plurality of sets of representative points, selected at the same interval as the search area consisting of $Q \times R$ pixels, and pixel data of the current field at the positions of the $q \times r$ pixel interval is calculated to find vectors, data of each vector are cumulatively summed to find the remainder, data of the remainder of each vector are compared to one another to find a motion vector and a motion vector is found at an interval less than $q \times r$ by interpolation from the motion vector and values of the remainder in its vicinity.

12 Claims, 16 Drawing Sheets

MOTION VECTOR DETECTION DEVICE

BACKGROUND OF THE INVENTION

1. Field of the Invention

This invention relates to a motion vector detection device for detecting the motion vector (the quantity of motion) of a moving picture.

2. Description of the Related Art

Detection of a motion vector of a moving picture in the conventional practice is hereinafter explained.

A plurality of representative points (pixels) Pk, where k=0, 1, 2, ... are designated for a picture $G_{-1}$ preceding a current field picture $G_0$ by one field. That is, referring to FIG. 14, a plurality of representative points Pk, where k=0, 1, 2, ..., 15, are designated for the picture G preceding the current picture by one field. The pixels of the picture $G_1$ of the current field, displaced by (x, y)=(n, m) from the representative points Pk one-field before are Ank, mk. Meanwhile, (n, m) denote vectors, x denotes the horizontal or transverse direction and y the vertical or longitudinal direction. The remainder S(n,m) in the vectors (n, m) is defined by formula 1.

$$S(n, m) = \sum_k |Ank, mk - Pk| \quad \text{Formula 1}$$

Referring to FIG. 14, a search area SE indicated by an area consisting of Q pixels and R pixels (the area defined by Q×R) is designated for each representative point Pk and the remainder S(n,m) is calculated for each of the vectors (n,m) in the search area SE in accordance with the formula (1). A value obtained by calculating vector ($n_{min}$, $m_{min}$) which will give the least remainder S(n, m) is called a motion vector. That is, since the picture one field before the current field and the picture of the current field in a moving picture may be reasonably thought of as being shifted by the vector ($n_{min}$, $m_{min}$), this vector is termed the motion vector.

An arrangement of a conventional motion vector detection device is shown in FIG. 15.

In this figure, picture data produced by raster scanning is supplied to an input terminal 101. During the time in which picture data one field before the current field is entered at the input terminal 101, data of the representative points Pk (k=0, 1, 2, ...) is stored in a representative point memory 102. Then, during the time when the current field picture data are supplied to input terminal 101, the remainders S(n,m) are calculated in the following manner.

That is, with the device shown in FIG. 15, when data of a pixel Ai,j of the current field are entered at input terminal 101, data of the representative point Pk corresponding to the search area SE containing data of Ai,j are read out from data of the representative point Pk stored in the representative point memory 102, and a processing operation shown by the formula $$|Ank, mk - Pk|$$

is carried out by a subtractor 103 and an absolute value unit 104. Since the purpose of the formula |Ank,mk−Pk| is to find a partial term of the remainder S(n,m), it is necessary to sum the results of calculation of the above formula cumulatively to find the remainder S(n,m).

To this end, a remainder memory 106 is provided in the arrangement of FIG. 15 for transiently holding intermediate results s(n, m). By way of a generalized explanation in connection with the arrangement of FIG. 15, data of the intermediate results s(n,m) of calculation of the remainder of the vector (n,m) corresponding to the pixels Ank,mk entered at input terminal 101 are read out from the remainder memory 106 and supplied to an adder 105 together with an output of the absolute value unit 104. An addition $$s(n,m) + |Ank,mk - Pk|$$

is carried out in the adder 105. The result of addition is used as a new intermediate result s(n, m) to replace (overwrite) the past intermediate result s(n, m) at the same address, by way of updating the data of the intermediate results s(n, m).

By repeating the writing/readout of the intermediate results of the remainder calculating operation from remainder memory 106, the cumulative operations of the formula |Ank,mk−Pk| are all terminated at a point in time when the supply of the data of the pixels Ai,j of the current field into the input terminal 101 is terminated. The value of the intermediate result s(n, m) stored at this time in the remainder memory 106 represents the remainder S(n,m).

The data of the remainders S(n,m) in the remainder memory 106 is then read out and supplied to a comparator 107 to find the least vector by comparative processing to find the motion vector ($n_{min}$, $m_{min}$). Data of the motion vector is output at an output terminal 108.

Since the remainder memory 106 needs to store the intermediate results transiently, it is of a storage capacity equal to (Q×R) words.

JP Patent KOKAI Publication 1-269371 (1989) discloses a motion vector detection device of the above type comprising an input circuit for inputting television image signals, a representative point designating circuit for designating plural representative points in a one-field region, a processing circuit for calculating picture signals of the representative points of a field preceding the current field by one or more fields and the current image signals, a memory circuit for writing and reading output signals of the processing circuit and a processing control circuit for controlling the representative point designating circuit and the memory circuit. The controlling operation by the processing control circuit is made by correlating the positions of the representative points designated by the representative point designating circuit with the designated memory region of the memory circuit.

Meanwhile, in a small-sized video camera having effective pixels per field of 512×256 (vertical-horizontal), the motion vector is detected by setting the search area SE to 64×16 (Q×R), and the motion of the picture caused by hand movements of the cameraman during shooting is compensated by shifting the picture frame based on the motion vector. That is, by writing the picture data of the current field in e.g. a field memory, and reading out the written data with a shift corresponding to the detected moving vector, by way of taking advantage of the moving vector, it becomes possible to produce a picture corrected for hand movements or similar oscillations.

It is noted that, in finding the motion vector, the more the number of the representative points, the less is the error in the moving vector.

Meanwhile, the maximum possible number of representative points in the above mentioned small-sized video camera is $(512\times256)/(64\times16)=8\times16=128$. That is, if the number of the representative points is more than this value, the search area SEa for a representative point Pka is overlapped with a search area SEb for another representative point Pkb, as shown in FIG. 16.

If the pixel of the overlapped portions, such as pixel Ai,j in FIG. 16, is entered in the above-mentioned conventional motion vector detection device, it becomes necessary to carry out processing operations represented by the formulas $|Ai,j-Pka|$ (a partial term of $S(3, -1)$) and $|Ai,j-Pkb|$ (a partial term of $S(-4, -3)$)

simultaneously, which impossible to perform by the conventional motion vector detection device. An example for $Q=9$ and $R=7$ is shown in FIG. 16.

It is noted that, for calculating the motion vector, the following method may be cited in addition to the above-mentioned method of calculating the remainder $S(n,m)$ for the entire raster.

This alternative method consists of dividing the raster into plural blocks for each of which the remainder in the above-mentioned vector (n,m) is calculated. For simplicity of explanation, an example is given herein of dividing the raster into first to fourth blocks $b^{[1]}$, $b^{[2]}$, $b^{[3]}$ and $b^{[4]}$. The remainder in the vector (n,m) in each of these blocks may be found by a processing operation in accordance with the formula (2).

$$S(n, m)^{[3]} = \sum_k |Ank, mk - Pk| \qquad \text{Formula (2)}$$

Meanwhile, in the formula (2), $k \in \{k | Pk \in \text{Bth block}\}$ and any one of the first to fourth blocks is indicated by $B=1, 2, 3$ or $4$.

A vector $(n_{min}, m_{min})$ which becomes least among the remainder $S(n,m)$ of the first block $b^{[1]}$, is calculated, and the value thereof is termed a motion vector of the first block $b^{[1]}$. Similar operations are carried out for each of the remainders $S(n\ m)^{[2]}$, $S(nm)^{[3]}$ and $S(n,m)^{[4]}$ and resulting values $(n_{min}, m_{min})^{[2]}$, $(n_{min}, m_{min})^{[3]}$, and $(n_{min}, m_{min})^{[4]}$; are termed motion vectors of the second, third and fourth blocks $b^{[2]}$, $b^{[3]}$ and $b^{[4]}$, respectively.

It is assumed that pixels of the first, second and the fourth blocks $b^{[1]}$, $b^{[2]}$ and $b^{[4]}$ image the background and those of the block $b^{[3]}$ image moving objects, such as men or cars. It is desirable that the background remains at a standstill without being moved from field to field.

If, in such case, the remainder is calculated for a raster in its entirety, the moving objects such as men or cars of the third block $b^{[3]}$ affect the remainder calculating process to render it impossible to find the correct motion vector. It is therefore more desirable to find the motion vector from block to block rather than to find the remainder for the raster in its entirety to find the motion vector.

Meanwhile, in the method to find the motion vector from block to block, as in the method to find the motion vector by calculating the remainder $S(n,m)$ for the raster in its entirety, the search areas SE for $Q\times R$ for the respective representative points are overlapped if too many representative points are used, so that it may occur that the motion vector cannot be found with conventional devices.

In view of the above described status of the art, it is an object of the present invention to provide a motion vector detection device in which, when finding the motion vector for the raster in its entirety or from each of the blocks of the raster, a large number of representative points can be taken which enable errors of the motion vector to be reduced and in which the motion vector can be calculated even if a large number of representative points are used.

OBJECT AND SUMMARY OF THE INVENTION

In accordance with the present invention, there is provided a motion vector detection device comprising a representative point memory for storing a plurality of sets of representative points selected at the same interval as that for search areas, each consisting of $Q\times R$ pixels of a picture of a field preceding the current fields by one or more field, calculating means for calculating an absolute value of a difference between data of the representative point, at a point in time when data of the current field are supplied, and data of pixels of the current field separated from said representative point by $q\times r$ pixels to find a vector, cumulative addition means for cumulatively adding vector-by-vector data from said calculating means to find a remainder, and a comparator interpolator circuit for comparing vector-by-vector data of the remainder from said calculating means to find a motion vector at an interval of $q\times r$ pixels and for occasionally interpolating from the moving vector and the remainder of the nearby positions to calculate motion vectors at the interval of $q\times r$.

The present invention also provides a motion vector detection device comprising a representative point memory for storing a plurality of sets of representative points selected at the same interval as that for search areas each consisting of $Q\times R$ pixels of a picture of a field preceding the current field by one or more fields, each field being divided into a plurality of blocks, calculating means for calculating an absolute value of a difference between data of the representative point, at a point in time when data of the current field are supplied, and data of pixels of the current field separated from said representative point by $q\times r$ pixels to find a block-by-block vector, cumulative addition means for cumulatively adding block-by-block vector-by-vector data from said calculating means to find a remainder, a comparator interpolator circuit for comparing the block-by-block vector-by-vector data of the remainder from said cumulative addition means to find a motion vector at an interval of $q\times r$ pixels, from block to block and for occasionally interpolating from the moving vector and the remainder of the near-by positions to calculate motion vectors at the interval of $q\times r$ pixels, and a decision circuit for deciding a true motion vector based on data of the motion vector from block to block obtained by comparison and interpolation by said comparator interpolator circuit.

With the motion vector detection device according to the present invention, the remainder is found from the representative points and pixel data of the current field at an interval of $q\times r$ pixels, q and r being natural numbers and at least one of them being not less than 2, instead of from data of the representative points and data of pixels in search areas each consisting of $Q\times R$ pixels, and motion vectors are found by interpolation from the remainder, as found by comparison, and the remainders of the nearby positions, so that the motion vectors may be detected at finer intervals.

DETAILED DESCRIPTION OF THE PREFERRED EMBODIMENTS

Figure 1:
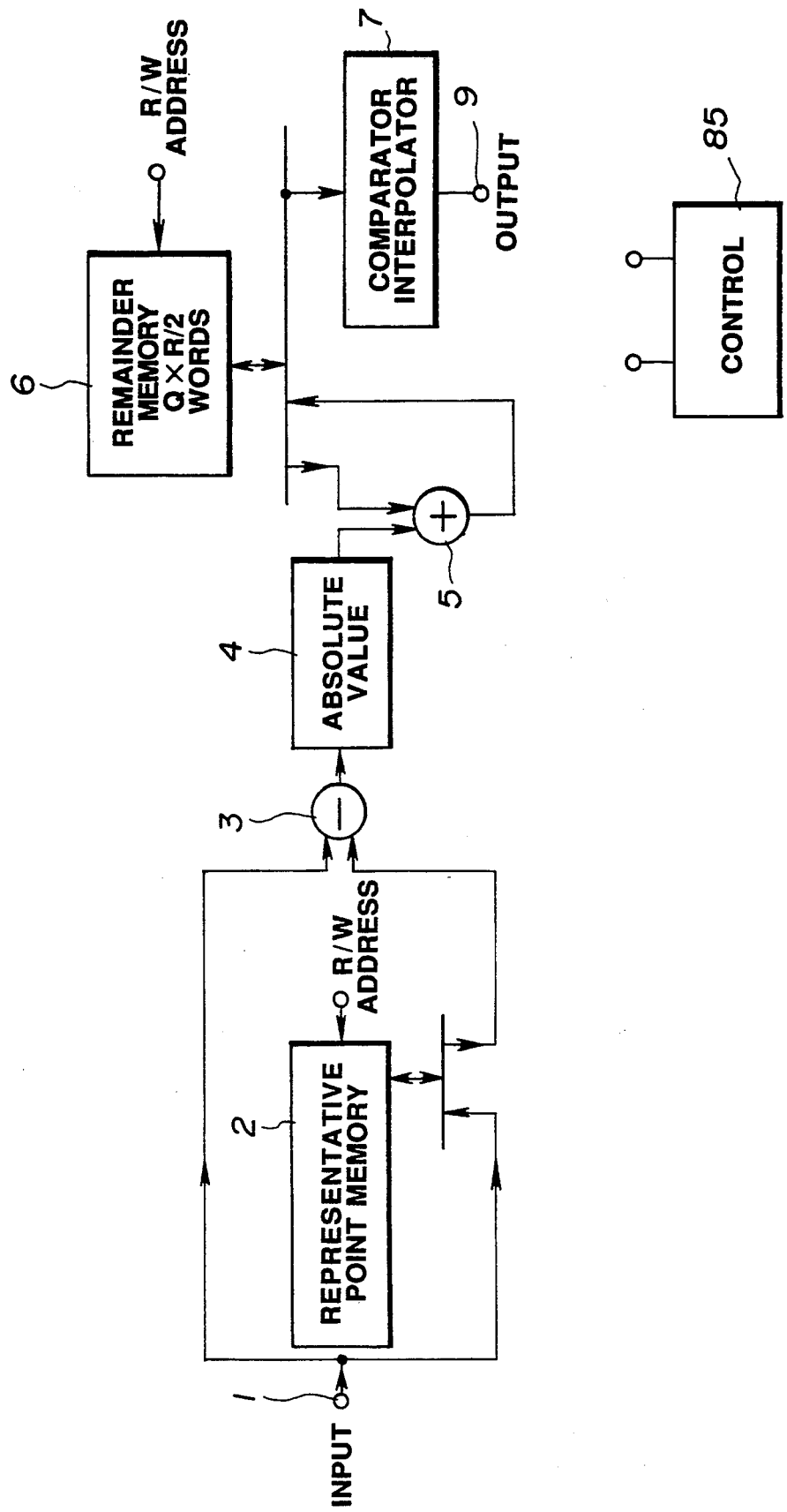
FIG. 1 is a block diagram of a detection device according to a first embodiment of the present invention.

Referring to the drawings, certain preferred embodiments of the motion vector detection device according to the present invention will be explained in detail. A motion vector detection device according to a first embodiment of the present invention is shown in FIG. 1.

The present first embodiment of the motion vector detection device includes a representative point memory 2 for storing data of a plurality of sets of representative points Pk (k=1, 2, 3, ... vw−1), consisting of Q×R pixels of the picture $G_{-1}$ preceding the current field by one or more fields, which representative points are selected at the same intervals as those of the search area SE, difference absolute value calculating means, consisting of a subtractor 3 and an absolute value unit 4 for calculating the absolute value of the difference between the representative points Pk, at the point in time of entrance of the pixel data of the picture $G_0$ of the current field, and data of pixels of the current field at the positions of the pixel intervals of q×r, where q and r are natural numbers and at least one of them is 2 or larger, cumulative addition means, consisting of an adder 5 and a remainder memory 6, for cumulatively adding data of each of vectors at intervals of q×r from the difference absolute value calculating means, a comparator interpolator circuit 7 for comparing data of the remainder for each vector in the remainder memory 6 to find a vector which becomes least at the q×r unit, and for interpolating the remainder of the least vector and the remainder at the neighboring position to calculate the motion vector at intervals of not more than q×r and a control circuit 85 for controlling the write/read-out addresses of the memories 2 and 6. An output of the comparator interpolator circuit 7 is output as a motion vector at an output terminal 9.

Figure 2:
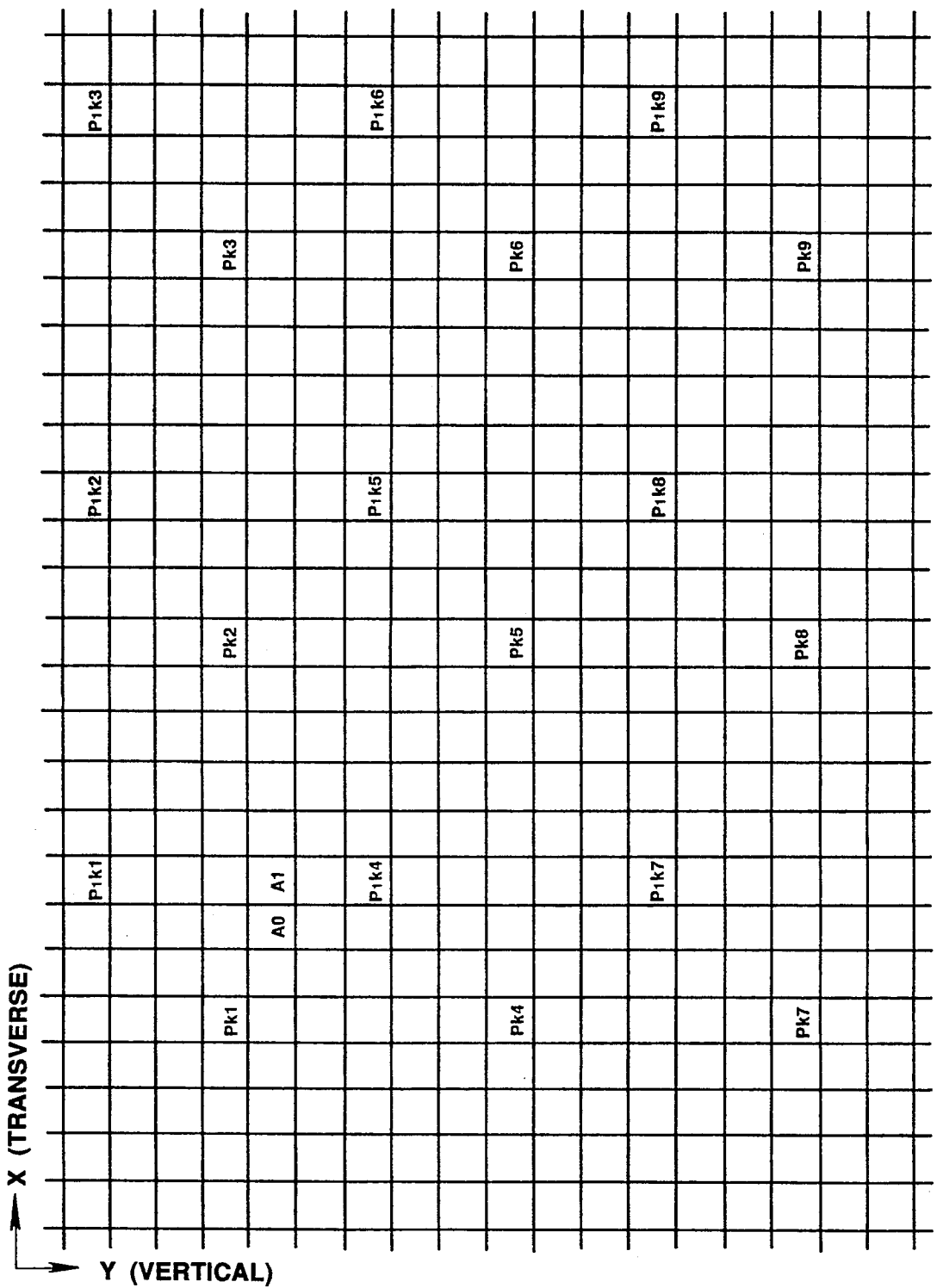
FIG. 2 is a diagrammatic view showing an example of representative points of the device shown in FIG. 1.

The search area SE is Q×R=8×6, as an example, Q being an even number. For the representative points $P_k$, representative points Pki, $P_1ki$ shown for example in FIG. 2, are selected, where i=1, 2, ..., 9 as shown for example in FIG. 2. That is, in FIG. 2, the representative points Pki are separated from one another by the above-mentioned distance equal to Q×R, whilst the representative points $P_1ki$ are separated from one another by the distance equal to Q×R. The relative position between the representative points Pki and $P_1ki$ is given by (x, y), where x is an odd number and y is an integer. In the example of FIG. 2, the representative points Pki and $P_1ki$ are related to each other by (3, −3), whilst the representative points Pk2 and $P_1k1$ are related with each other by (−5, −3).

Figure 3:
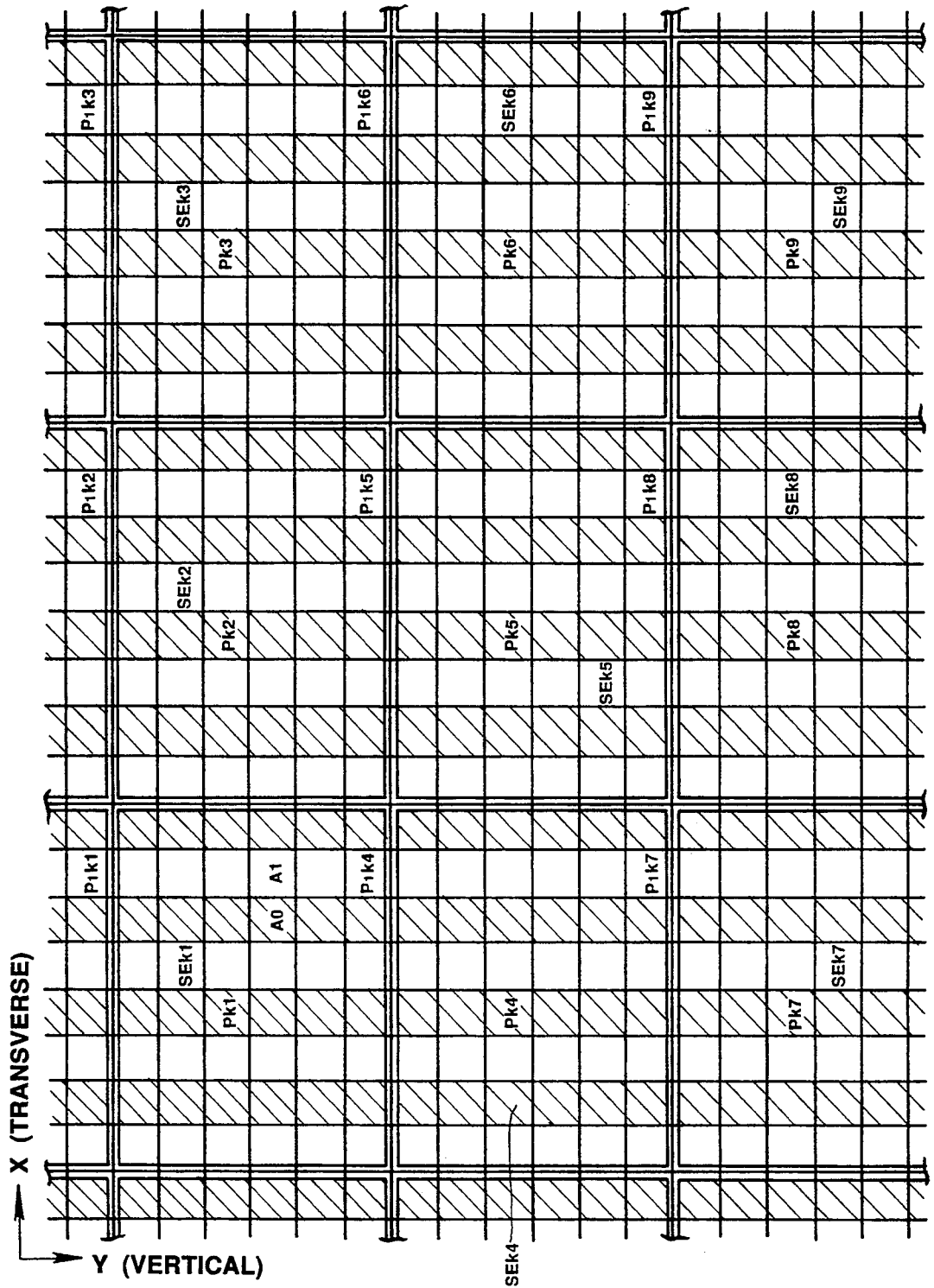
FIG. 3 is a diagrammatic view showing a search area SEki for representative points Pki in the device shown in FIG. 1.
Figure 4:
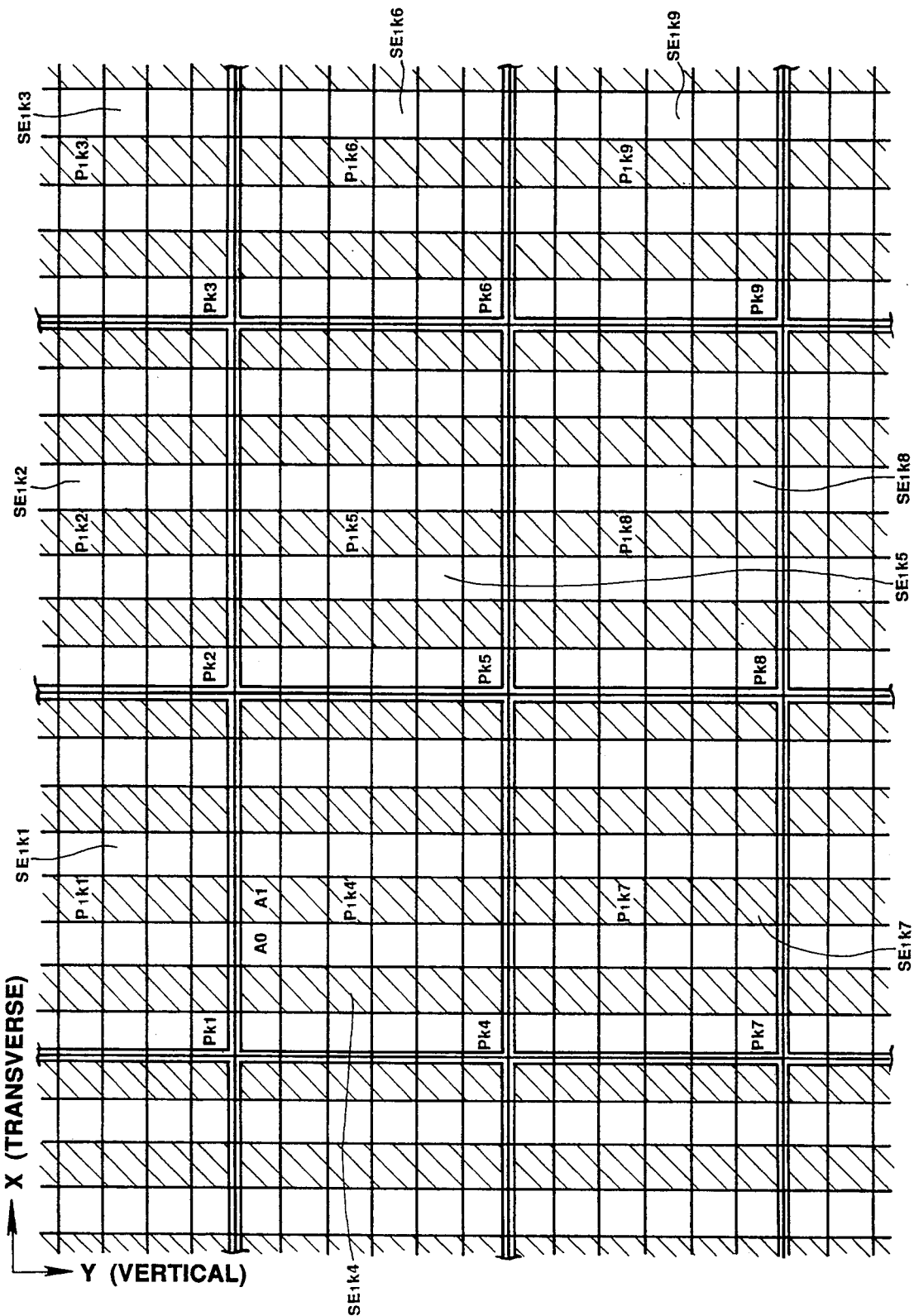
FIG. 4 is a diagrammatic view showing a search area $SE_1ki$ for representative points $P_1ki$ in the device shown in FIG. 1.

Therefore, the search areas SE for the representative points Pki, $P_1ki$ are as shown in FIGS. 3 and 4. FIG. 3 shows search areas for the respective search points Pki. For example, the search area SEk1 for the representative point Pk1, a search area SEk2 for the representative point Pk2, and so forth, up to a search area SEk9 for the representative point Pk9, are shown. Similarly, in FIG. 4, a search area $SE_1ki$ for a representative point $P_1ki$ is shown. For example, a search area $SE_1k1$ for a representative point $P_1k1$, a search area $SE_1k2$ for a representative point $P_1k2$, and so forth, up to a search area $SE_1k9$ for a representative point $P_1k9$, are shown. In FIGS. 3 and 4, although the search area SEki for the representative point Pki and the search area $SE_1ki$ for the representative point $P_1ki$ overlap with each other, the search areas SEki are not overlapped with one another, while the search areas $SE_1ki$ are not overlapped with one another.

It is noted that, with the above described prior-art device, it is necessary to find the remainder S(n, m) for n=−3, −2, −1, 0, 1, 2, 3, and 4 and for m=−2, −1, 0, 1, 2 and 3. That is, with the prior art device, it is necessary to calculate Q×R=8×6=48 remainders and, therefore, for summing the absolute values of the differences from the representative points Pk together, a 48-word remainder memory is required for transiently holding the data of intermediate results of summation. Besides, with the prior art device, only the representative point Pk may be provided, while it is not possible to overlap the search areas. In addition, if the search areas SEki and $SE_1ki$ are overlapped with each other, as are the search area SEki for the representative point Pki and the search area $SE_1ki$ for the representative point $P_1ki$ of the present embodiment, it is not possible with the above described prior art arrangement to make calculations to find the remainder.

On the contrary, with the first embodiment of the present invention, the remainder is found based on the pixel interval (x, y)=(2, 1), that is, at a pixel interval q×r=(2×1). Thus the remainder S(n, m) is found for n=−2, 0, 2 and 4 and m=−2, −1, 0, 1, 2 and 3, as an example. An interpolating operation as later described is carried out on the basis of these values of the remainder S(n, m) to find the remainder based on units of (x, y)=(1, 1) or on finer pixel intervals.

In the present embodiment, since n=−2, 0, 2 and 4 and m=−2, −1, 0, 1, 2 and 3, it suffices to calculate the absolute values of the differences from the representative points by units of (2, 1).

For example, since the relative position between data of the pixel A0 of the current field and the representative point Pk1 is (2, 1), as shown in FIGS. 2 and 3, the results of calculation of the absolute values of the differences |A0−Pk1| is a partial term of the remainder S(2, 1). It is therefore necessary to calculate the formula |A0−Pk1|. The remainder S(n, m) is found with an interval n=2, while it is unnecessary to calculate the partial term of the remainder S(3, 1). With this in view, data of the current field for which the absolute values of the differences from the representative point Pki are calculated are shown by hatched lines in FIG. 3. Meanwhile, the relative position between the pixels shown by hatched lines in FIG. 3 and the representative point Pki is given by (x, y), where x is an even number and y is an integer.

Similarly, data of the current field for which the absolute values of the differences from the representative point $P_1ki$ are calculated are shown by hatched lines in FIG. 4. Meanwhile, the relative position between the pixels shown by hatched lines FIG. 4 and the representative point $P_1ki$ is similarly given by (x, y), where x is an even number and y is an odd number.

Since the numbers Q in the horizontal direction of the search area SE are even numbers, as described above, the hatched portions in FIGS. 3 and 4 are different in relative positions to each other.

The operation of the device shown in FIG. 1 is hereinafter explained. In this figure, when data of the image $G_{-1}$ of the field preceding the current field are entered at input terminal 1, data of representative points Pki and $P_1ki$ are stored in the representative point memory 2.

In the remainder memory 6, data of the intermediate results of the remainder s(n, m) from the difference absolute value calculating means are stored. The remainder memory 6 is a memory of a size of Q×R/2 words.

Supposing that, among data of the current field, data of a pixel A0 shown for example in FIG. 2 are entered at input terminal 1, data of the representative point, Pki are read out from the representative memory 2, and calculation of |A0−Pki| (partial term of the remainder (2, 1)) is carried out by subtractor 3 and absolute value unit 4. At this time, data of the intermediate remainder results s(2, 1), as found by the previously made calculation of the absolute value of the difference, are read out by remainder memory 6. These data and the data supplied by the absolute value unit 4 are supplied to the adder 5 where the formula s(2, 1)+|A0−Pki| is calculated.

The calculated results of the formula are newly set to be intermediate results of the remainder s(2, 1) and overwritten at an address where old data of the intermediate results of the remainder memory 6 were stored. That is, the old data of the intermediate results of the remainder s(2, 1) are updated by the new data of the intermediate results of the remainder s(2, 1).

If, among the data of the current field, data of the pixel A1 of FIG. 2 are entered at the input, terminal 1, data of the representative point $P_1k4$ are read from representative point, memory 2, and |A1−$P_1k4$| (partial term of the remainder S (0, −2)) is calculated by the subtractor 3 and the absolute value unit 4. At this time, data of the intermediate results of the remainder s (0, −2) are read from the remainder memory 6. These data and the data of the absolute value of the difference are supplied to adder 5 where the formula s(0, −2)+|A1−$P_1k4$| is calculated.

The calculated results are newly set to the intermediate results of the remainder s(0, −2) and overwritten at the address of the remainder memory 6 where old data of the intermediate results of the remainder were stored.

By carrying out the above-mentioned calculations, the data of the intermediate results of the remainder s(n, m) stored in the remainder memory 6 at the point in time when the data of the current field have all been entered at the input terminal 1 are taken out as the remainder S(n, m).

The remainder S(n, m) (n=−2, 0, 2 and 4, m=−2, −1, 0, 1, 2 and 3) is entered at the comparator interpolator circuit 7 were the least vector (n, m) (n=−2, 0, 2 or 4 and m=−2, −1, 0, 1, 2 or 3) is calculated. If need be, the motion vector is found by interpolation from the least point and the remainder of the neighbor by an interpolating operation as hereinafter explained.

An example of the interpolation is explained.

The motion vector is found by a comparator enclosed in the comparator interpolator circuit 7 with the (2, 1) pixel unit. A vector (n, m) which will be least is found from the input remainder S(n, m) (n=−2, 0, 2 or 4, m=−2, −1, 0, 1 or 2) and is set to a vector (I, J). Meanwhile, the real motion vector (motion vector found by units of pixels (1, 1)) may be a vector (I−1, J) or a vector (I+1, J). Thus the remainder at the vectors (I−1, J) and (I+1, J) are interpolated from the values of the remainders S(I−2, J), S(I, J) and S(I+2, J). The interpolated values are $S_0$(I−1, J), $S_0$(I+1, J).

The interpolated value $S_0$(I+1, J) is calculated in the following manner.

Figure 5:
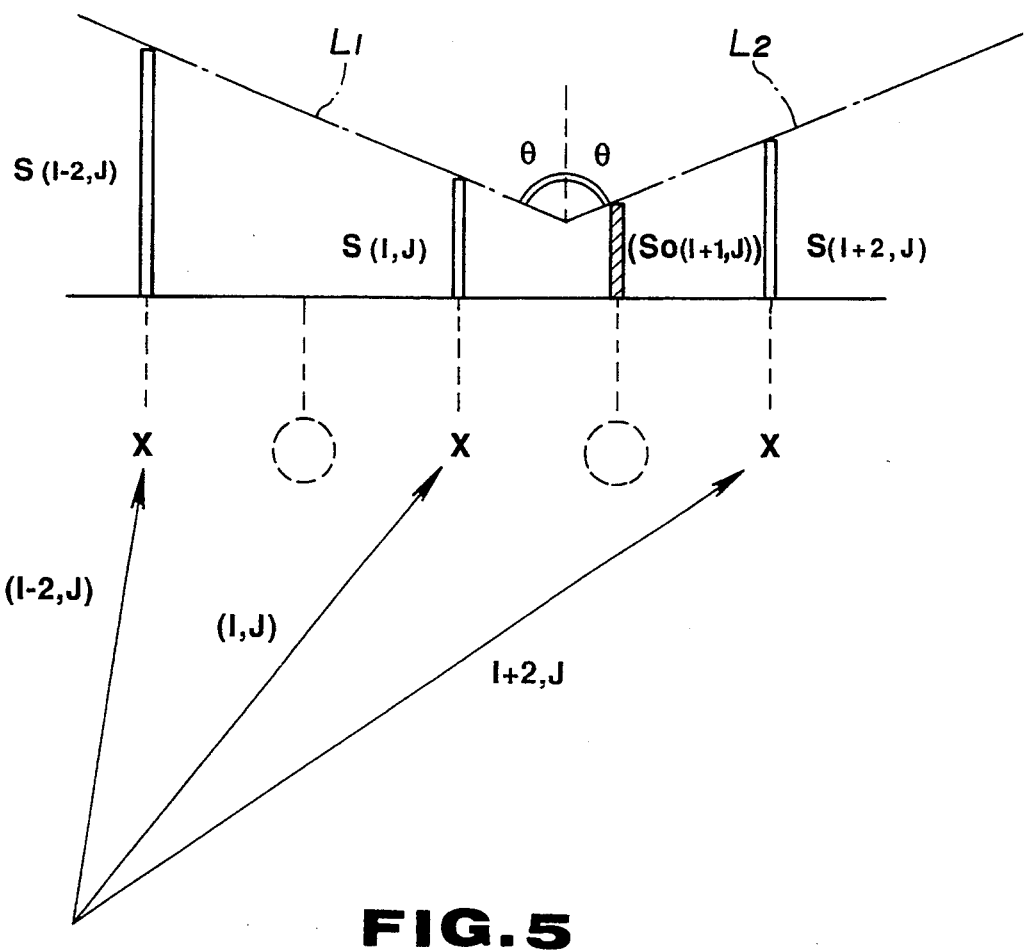
FIG. 5 is a diagrammatic view showing a method of interpolation for finding a motion vector at a pixel interval of (2, 1).

If S(I−2, J)≧S(I+2, J), for example, the relation between i and the remainder S(i, J) where J is fixed and i is variable, is as shown in FIG. 5. A straight line in which the remainder is S(I−2, J) and S(I, J) for i=I−2 and i=I, respectively, is $L_1$. A straight line having a gradient equal to the line $L_1$×(−1) and having a remainder S(I+2, J) is $L_2$. Since the remainder at each of these positions is thought to be on the straight lines $L_1$, $L_2$, a value which is on the straight line $L_2$ and for which i=I+1 is an interpolated value $S_0$(I+1, J). Since the remainder S(I−1, J) is larger than the remainder S(I, J), it is unnecessary to find the interpolated value $S_0$(I−1, J).

The remainder S(I, J) is compared to the interpolated value $S_O$ (I+1, J) and the smaller position vector (I, J) or the vector (I+1, J) is output as the motion vector.

In effect, if the straight lines $L_1$, $L_2$ are calculated to find the interpolated value $S_0$(I+1, J), $S_0$(I+1, J)=(S(I, J)−S(I−2, J)+2S(I+2, J))/2 so that, in order to find the motion vector, the remainder S(I, J) is compared to (S(I, J)−S(I−2, J)+2S(I+2, J))/2 as to which of them is larger.

Figure 6:
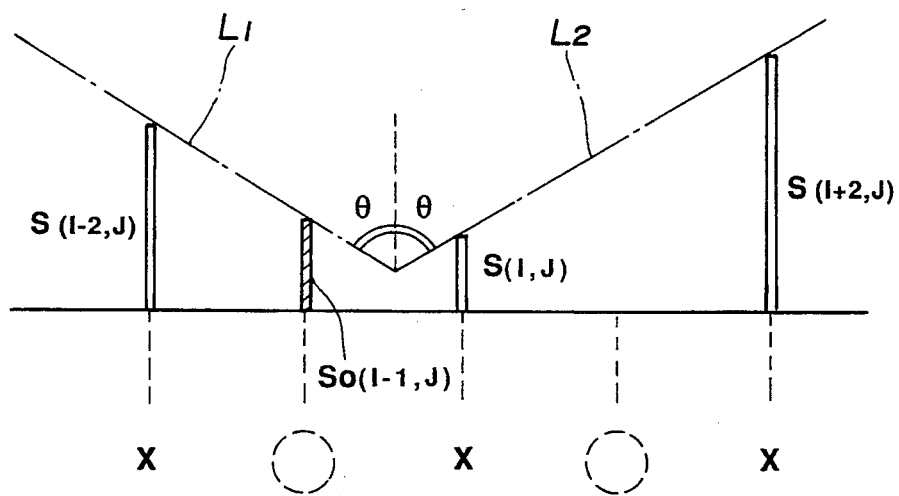
FIG. 6 is a diagrammatic view showing an alternative method of interpolation.

The foregoing statement with reference to FIG. 5 is similar to the case of FIG. 6 where S(I−2, J)<S(I+2, J). In the example of FIG. 6, the interpolated value $S_0(I-1, J)$ is found for the case in which $S(I-2, J)<S(I+2, J)$. That is, if $S(I-2, J)<S(I+2, J)$, the relation between i and the remainder $S(I, J)$ is shown in FIG. 6. The remainder $S(I, J)$ is compared to the interpolated value $S_0(I-1, J)$ as described above and the lesser position (vector (I, J) or vector (I−1, J)) is output as a motion vector. Since the remainder $S(I+1, J)$ is larger than the remainder $S(I, J)$, it is unnecessary to find the interpolated value $S_0(I+1, J)$.

Figure 7:
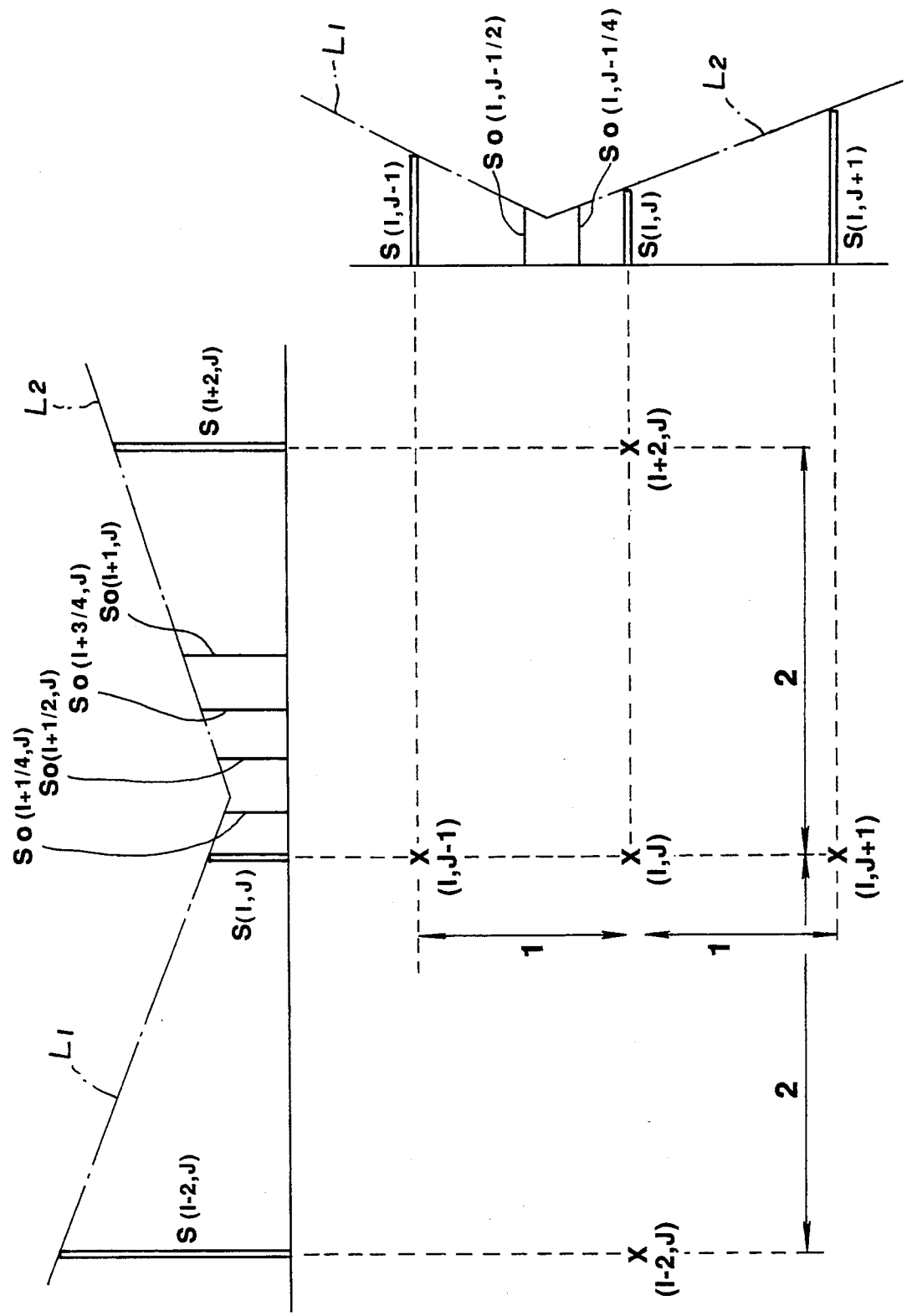
FIG. 7 is a diagrammatic view showing a method of interpolation for finding a motion vector at a pixel interval of ($\frac{1}{2}$, $\frac{1}{2}$).

In FIG. 7, the straight lines $L_1$, $L_2$ are drawn as in FIG. 5, and the remainders of the vectors $(I+(\frac{1}{4}), J)$, $(I+(\frac{3}{4}), J)$ and $(I+1, J)$ are interpolated and i, among the remainders $S(I, J)$ or the interpolated values $S_0(i, J)$, which becomes the least $(i=I, I+(\frac{1}{4}), I+(\frac{3}{4})$ or $I+1)$ is found.

Similarly, in the vertical direction, straight lines are drawn as shown in FIG. 5, based on the remainders $S(I, J-1)$ and $S(I, J+1)$ to find interpolated values $S_0(I, J-(\frac{1}{4}))$, $S_0(I, J-(\frac{3}{4}))$ and i, among the remainder $S(I, J)$ or the interpolated values $S_0(I, J-(\frac{1}{4}))$, $S_0(I, J-(\frac{3}{4}))$ which becomes the least $(i=J, J-(\frac{1}{4}), J-(\frac{3}{4})$, is found.

The vector (i, j) thus found is the motion vector.

Meanwhile, FIG. 7 shows a case for $S(I-2, J) \geq S(I+2, J)$, $S(I, J+1) < S(I, J+1)$.

Figure 8:
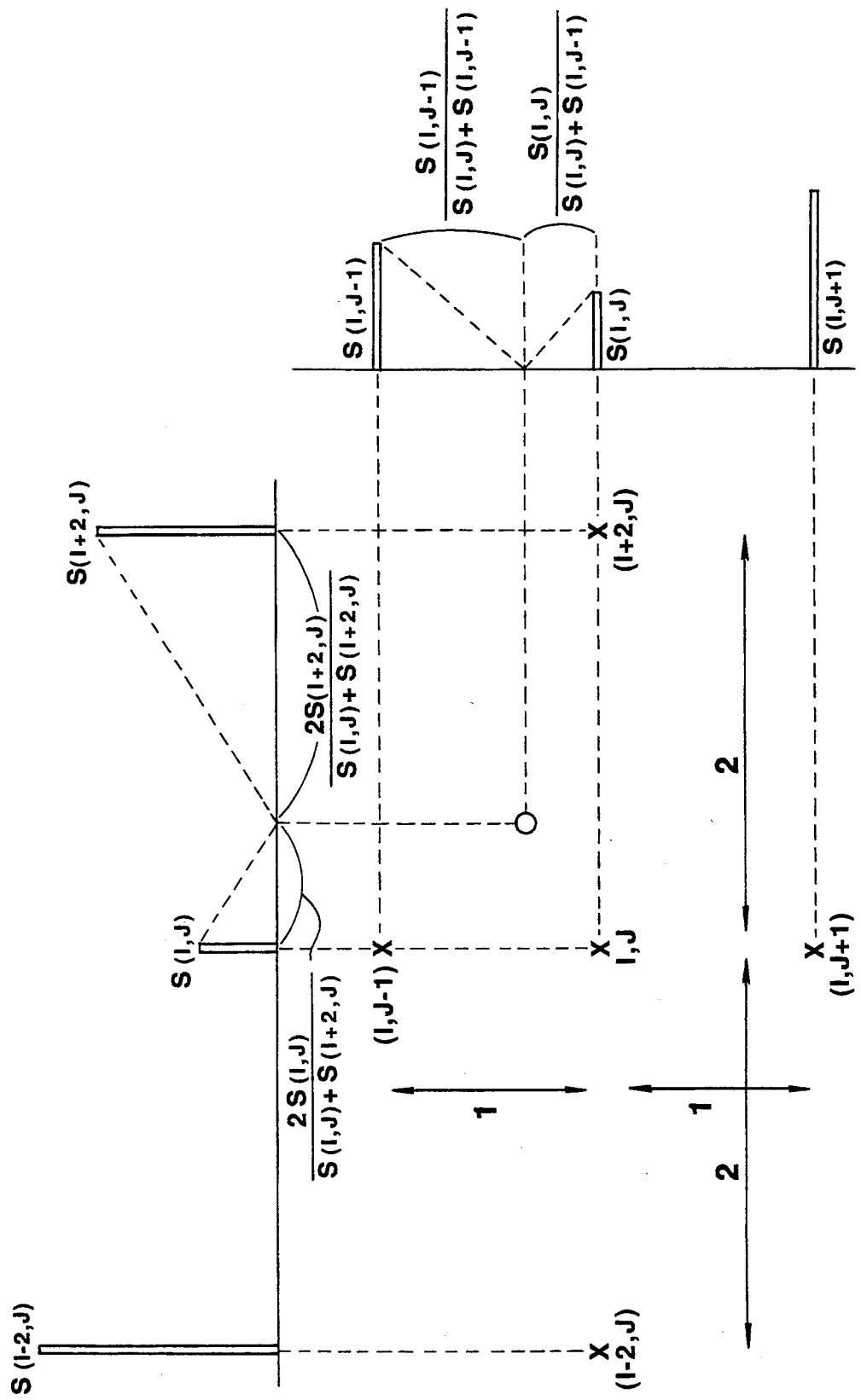
FIG. 8 is a diagrammatic view showing another alternative method of interpolation.

An interpolation method as shown in FIG. 8 may also be used.

With the interpolating method, shown in FIG. 8, the larger one of the remainders $S(I-2, J)$ and $S(I+2, J)$ in the horizontal or x axis is disregarded. In the example of FIG. 8, the remainder $S(I-2, J)$ is disregarded. A point of interior division between the lesser one (remainder $S(I, J-1)$ in FIG. 8) and the remainder $S(I, J)$ is found. That is, the point of interior division shown by the formula 3 is an x-component of the desired motion vector.

$$\frac{2S(I, J)}{S(I, J) + S(I+2, J)} : \frac{2S(I+2, J)}{S(I, J) + S(I+2, J)} \quad \text{Formula 3}$$

In the vertical direction (y-component), a larger one of the remainder $S(I, J-1)$ or the remainder $(I, J+1)$, in this case the remainder $S(I, J+1)$, is disregarded, and a point of internal division of the lesser remainder, herein the remainder $S(I, J-1)$, and a remainder $S(I, J)$ is found. That is, the point of internal division shown by the formula 4 is a y-component of the desired motion vector.

$$\frac{S(I, J)}{S(I, J) + S(I, J-1)} : \frac{S(I, J-1)}{S(I, J) + S(I, J-1)} \quad \text{Formula 4}$$

The above described interpolating method is simply illustrative and is not limitative of the present invention.

If the motion vector with the pixel units (2, 1) suffices as an output, a simple comparator performing only a comparative operation may be used in place of the comparator-interpolator circuit 7.

The write/readout addresses of the representative point memory 2 and the remainder memory 6 are controlled by a control circuit 85, through a R/W address port of remainder Memory 6.

In FIGS. 1 and 2, the remainder is found at a pixel interval of (2, 1) from the representative points and the data of the current field. It becomes possible to take 2 points at the maximum per $Q \times R$ so that it suffices if the remainder memory 6 is of a capacity of $Q \times R/2$ words.

In general, q representative points at the maximum may be taken per $Q \times R$, by finding the remainder at a pixel pitch of (q, 1), so that the remainder memory of $Q \times R/q$ words suffices. Also, by finding the remainder at a pixel interval of (q, r), qr representative points at the maximum may be taken per $Q \times R$, so that the remainder memory of $Q \times R/q \times r$ words suffices. Meanwhile, q and r are integers.

Figure 9:
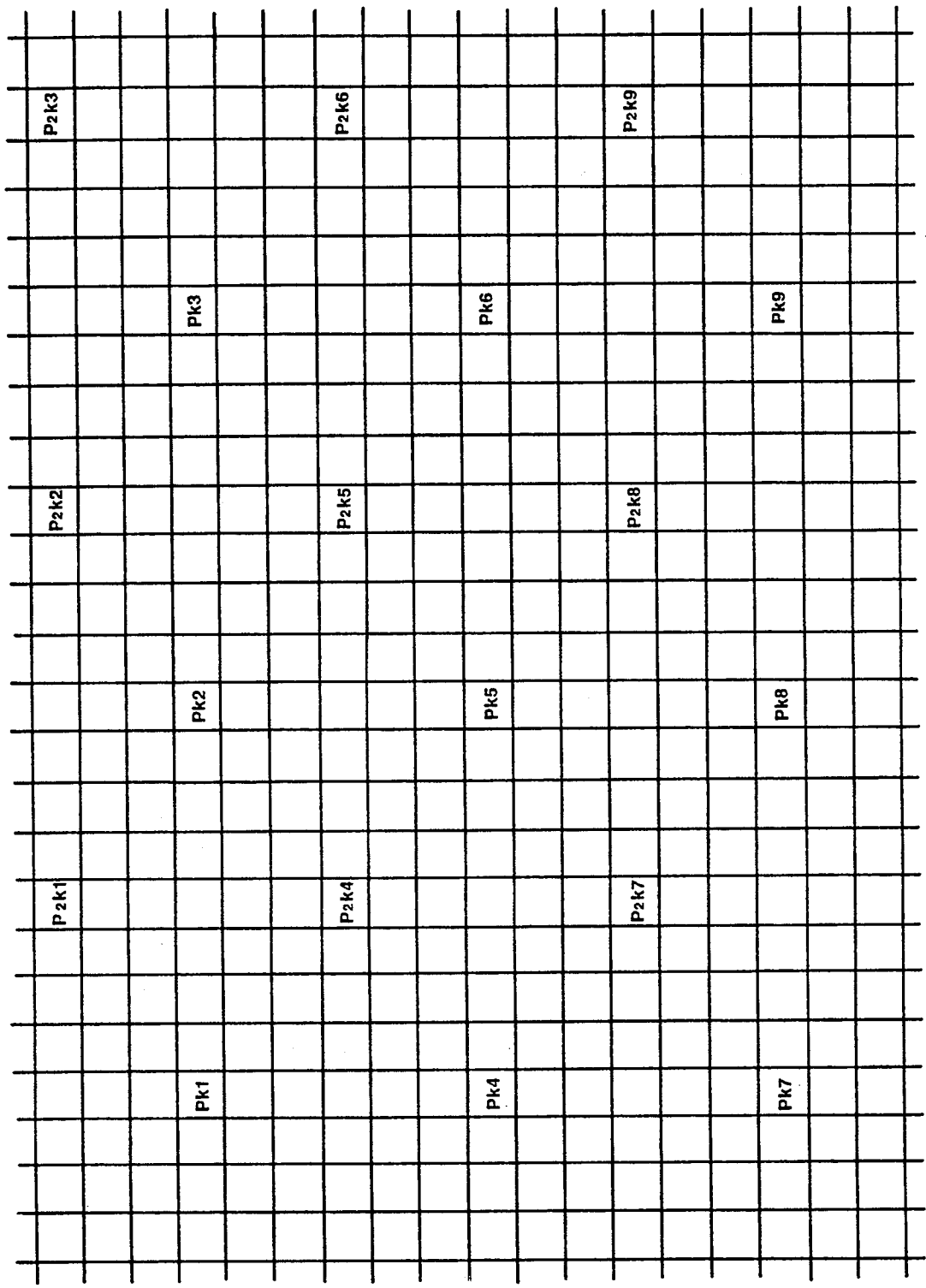
FIG. 9 is a diagrammatic view showing alternative representative points in the device shown in FIG. 1.

In FIG. 1, representative points $P_{2ki}$ shown in FIG. 9 may be taken. In FIG. 9, $Q=8$ and $R=6$ and the remainder found from the representative point and the data of the current field is at an interval of a checkerboard pattern, as shown by hatched portions shown in FIGS. 10 and 11. That is, calculation is made of the remainders $S(2n, 2m)$, $S(2n-1, 2m+1)$ $(n=-1, 0, 1, 2, m=-1, 0, 1)$, or 24 $(Q \times R/2)$ to find $S_0(*, *)$ by interpolation from these vectors and the neighbor remainder to find the motion vector at (1, 1) pixel units, or at a finer interval.

Figure 10:
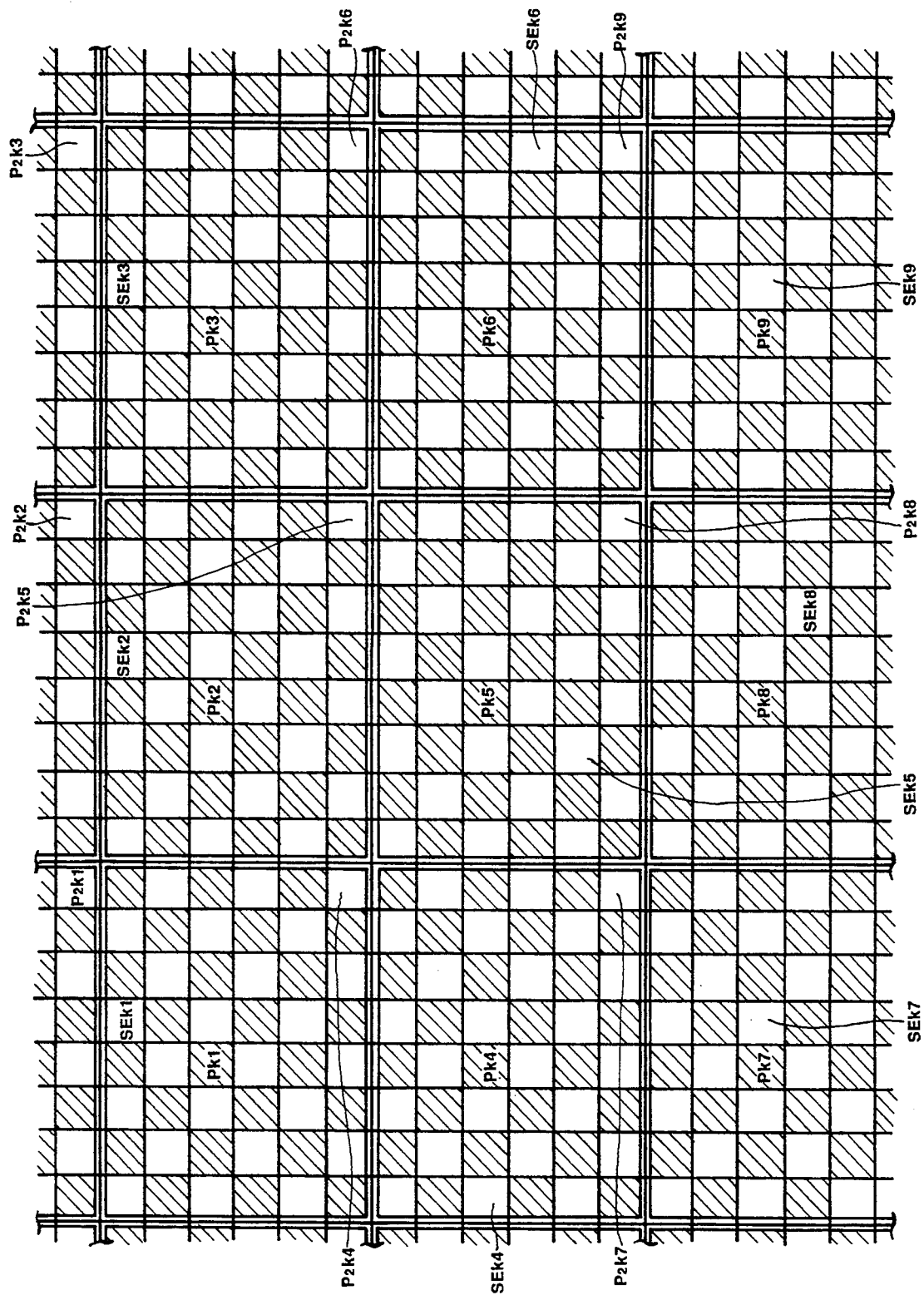
FIG. 10 is a diagrammatic view showing a search area SEki for other representative points Pki in the device shown in FIG. 1.
Figure 11:
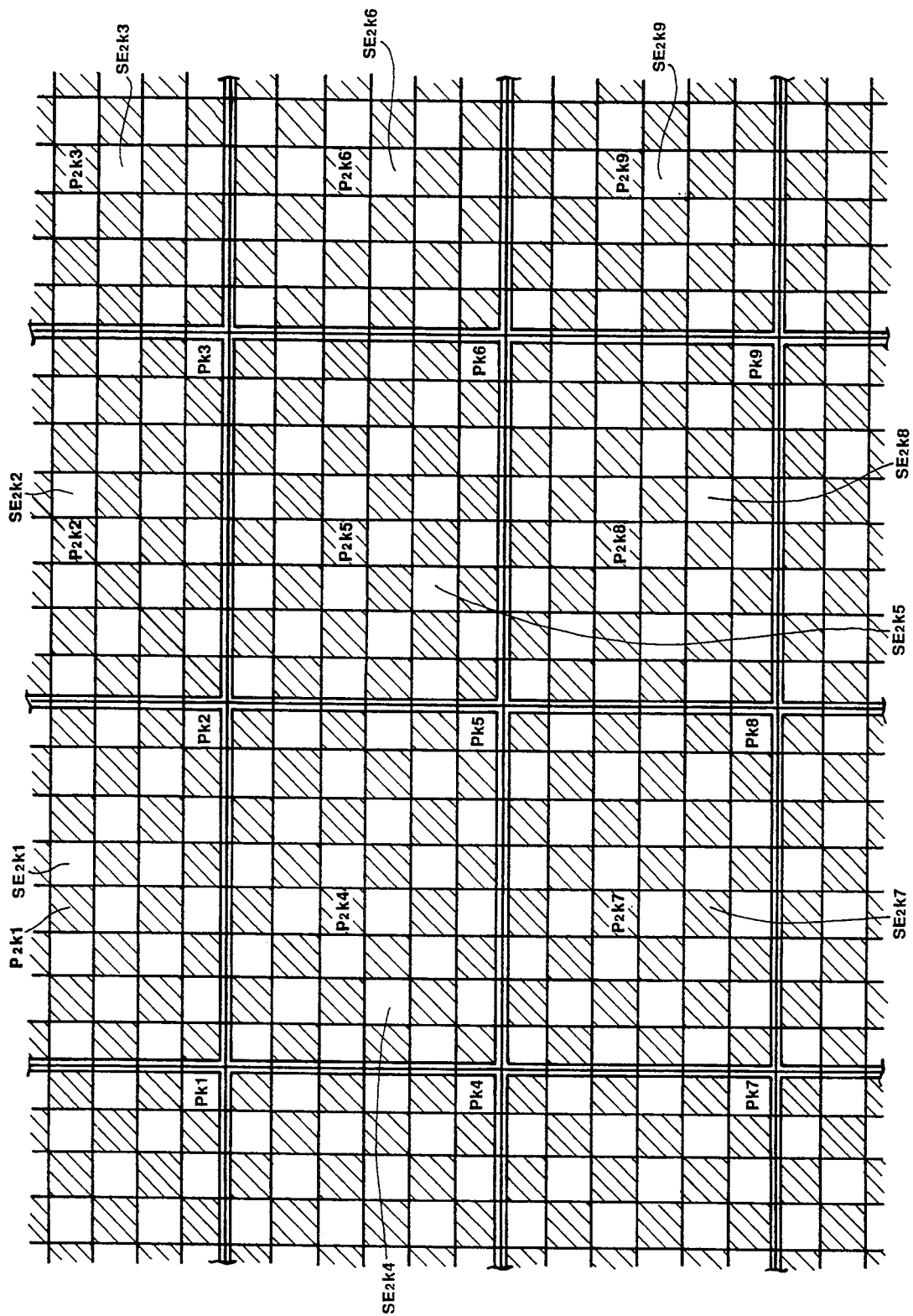
FIG. 11 is a diagrammatic view showing a search area $SE_2ki$ for representative points $P_2ki$ in the device shown in FIG. 1.

FIG. 10 shows the representative points Pki and search areas SEki for the representative points Pki and pixels for finding the remainder by calculating the representative point Pki and the absolute value of the difference. FIG. 11 also shows the representative points $P_{2ki}$, the search areas $SE_{2ki}$ and the pixels (shown by hatched lines) for finding the remainder by calculating the absolute value of the difference. In FIGS. 10 and 11, the hatched portions are at different positions from one another.

With the above described motion vector detection device, the remainder at $Q \times R/q \times r$ positions, where q and r are natural numbers equal to at least 2, for pixel units not less than 2 along one of the horizontal and vertical directions, is found, and the motion vector is found at a $1 \times 1$ pixel interval, or at finer intervals, by interpolation from the remainder which gives the least calculated value, or the neighboring remainder, instead of calculating the remainder at $1 \times 1$ pixel interval within the search area SE. In this manner, the remainder memory 2 of the size of $Q \times R/q \times r$ suffices in place of the conventional memory with the size of $Q \times R$. It becomes possible to take the representative points in an amount larger than the number in a conventional system equal to $q \times r$ times the number in the conventional system, in which each one point is taken at an interval of $Q \times R$, to permit more accurate detection of motion vector. In addition, with the present embodiment, each subtractor and absolute value unit suffice for calculating the absolute value of the difference even though many representative points may be taken, so that the device is not increased in size.

Figure 12:
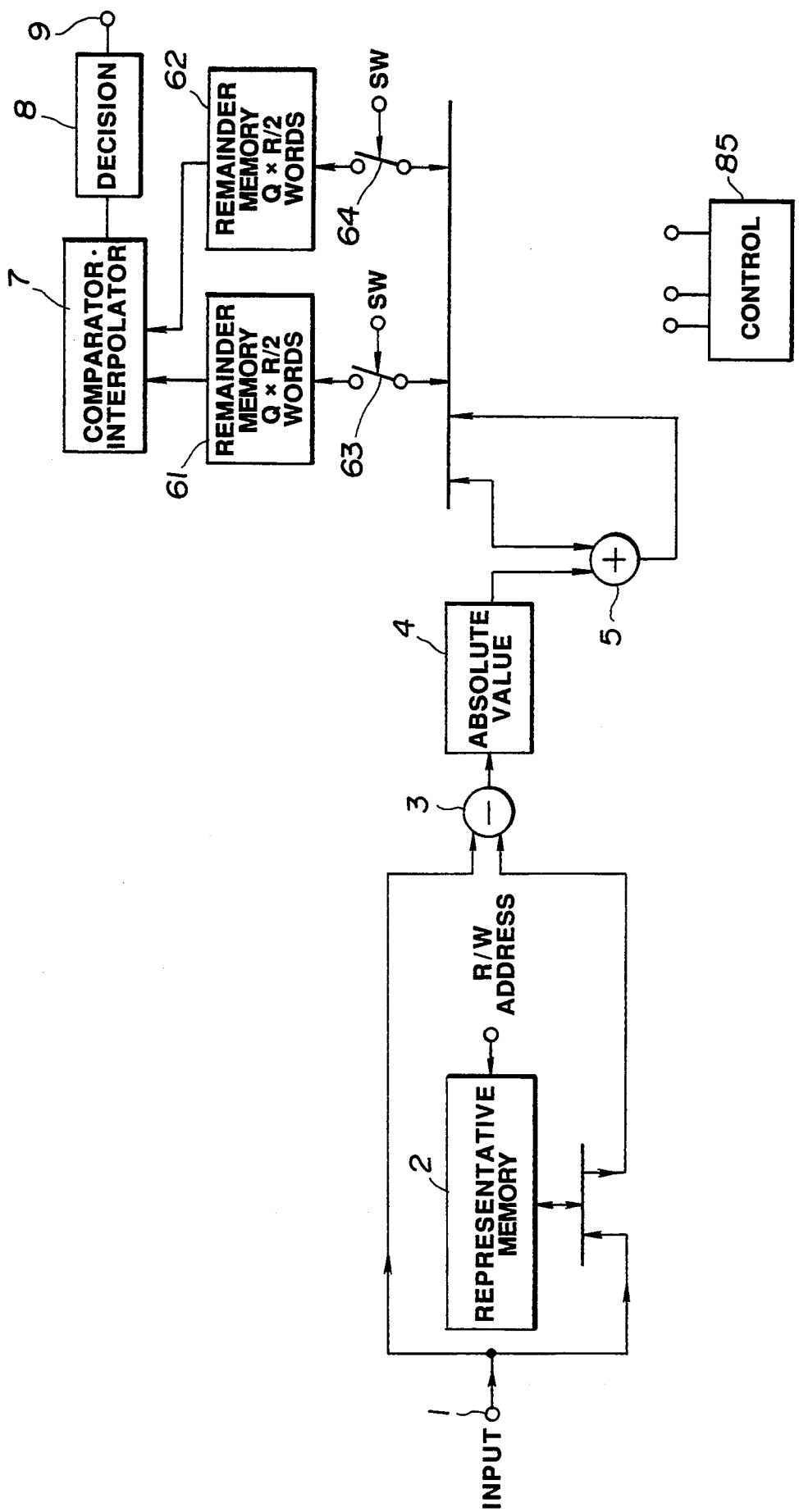
FIG. 12 is a block diagram showing a device according to a second embodiment of the present invention.

The motion vector detection device of the present invention may be arranged as shown in the second embodiment shown in FIG. 12.

The device of the present second embodiment is shown in FIG. 12 and includes a representative memory 2 for storing data of a plurality of sets of representative points selected at the same intervals as the search area SE consisting of $Q \times R$ pixels of a picture of a field preceding the current field by one or more fields, with the data of each field being divided into plural blocks, such as four blocks $b^{[1]}$ to $b^{[4]}$, difference absolute value calculating means for calculating the absolute value of the difference between data at the representative points at the point in time when data of the pixel of the current field are entered at the input terminal 1, and data of the pixel of the current field at the $q \times r$ pixel interval, where q and r are natural numbers and at least one of them is 2 or more, cumulative summation means consisting of an adder and a remainder memory (e.g. remainder memories 61, 62) for cumulatively summing data of the block-by-block vectors from the difference absolute value calculating means for finding the remainder, a comparator interpolator circuit 7 for comparing residue data from each vector within the memories 61, 62 of the cumulative summation means for each block to find the motion vector for each block and for interpolating from the remainder of the motion vector and the neighboring position to find the motion vector of each block at intervals less than q×r, a decision circuit 8 for making judgment as to if the output of the comparator interpolator means supplied thereto is or is not a real motion vector, and a control circuit 85 for controlling the write/readout addresses of the representative memory 2 and the remainder memories 61, 62. In this figure, parts of components similar to those shown in FIG. 1 are indicated by the same numerals and detailed description is omitted for simplicity.

In the present second embodiment, the representative points are taken as shown in FIG. 2, and Q×R=8×6.

Figure 13:
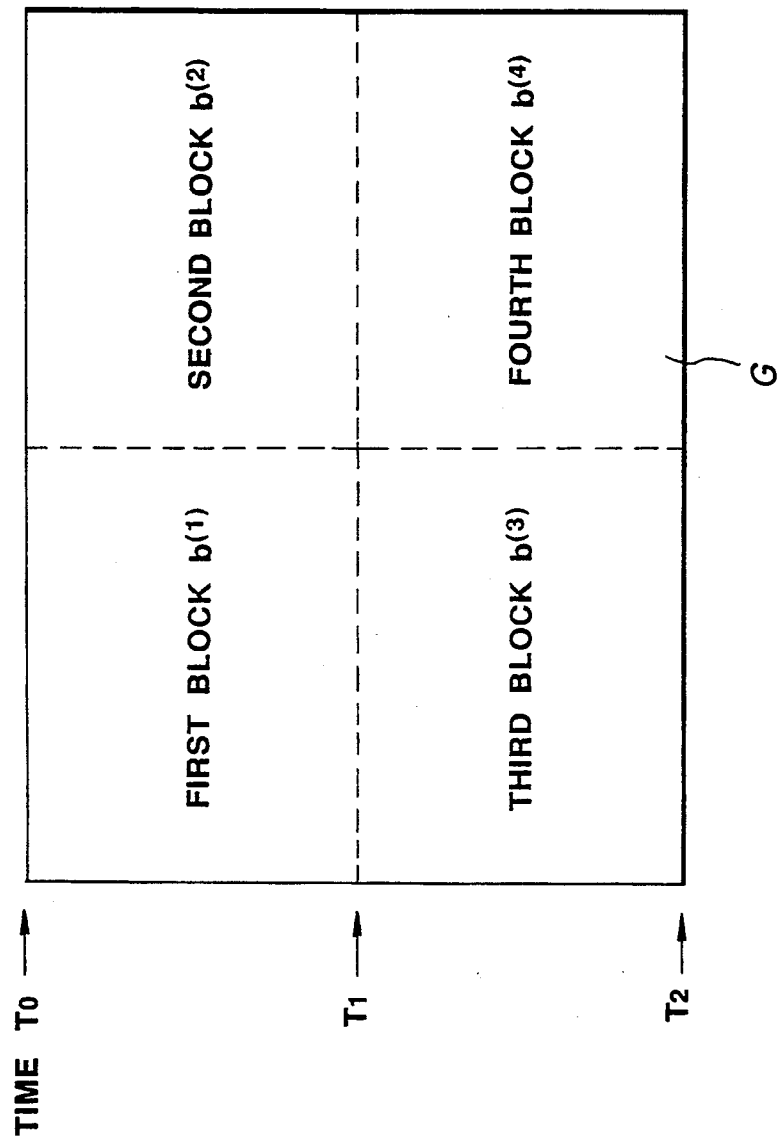
FIG. 13 shows blocks in the device shown in FIG. 12.
Figure 14:
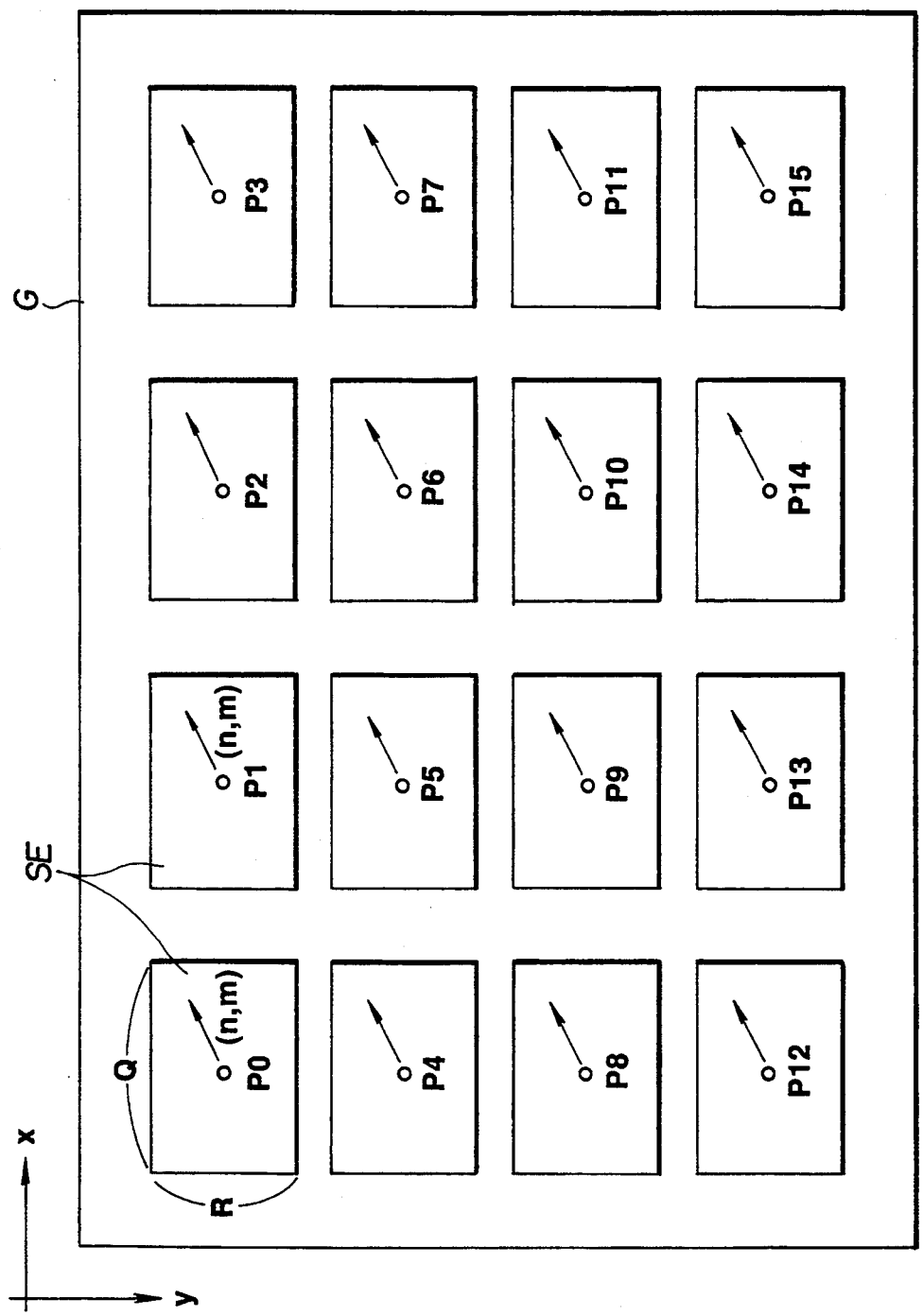
FIG. 14 shows conventional search areas and representative points.
Figure 15:
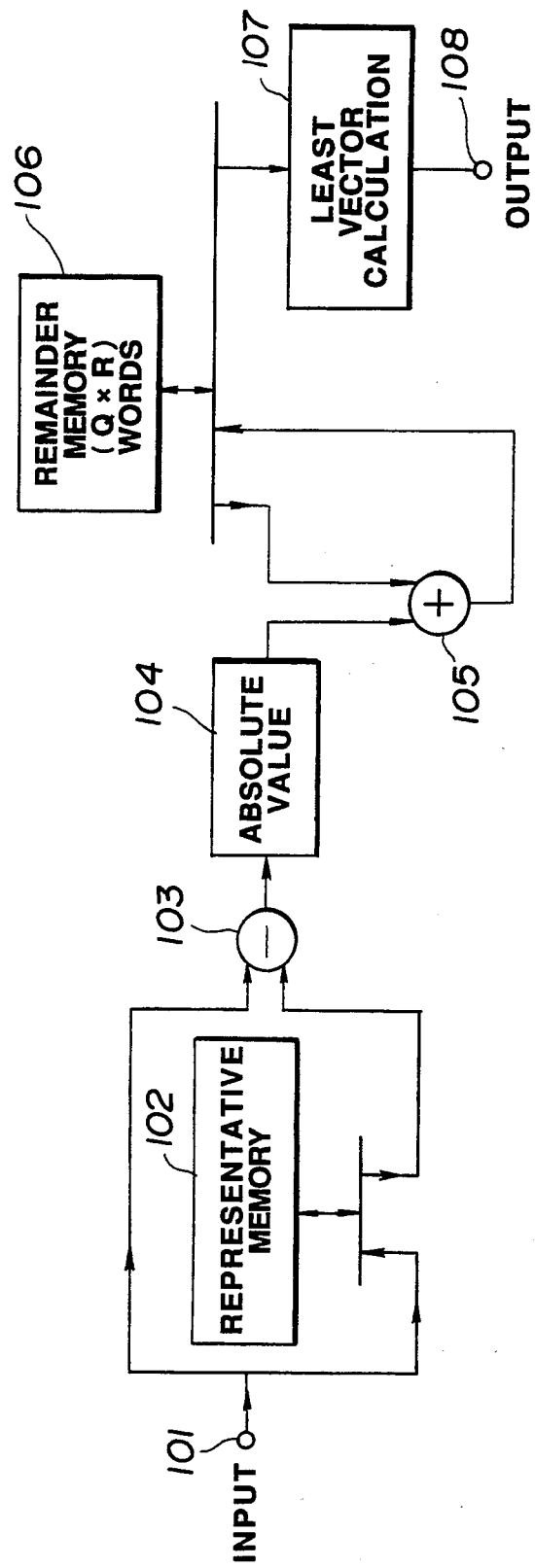
FIG. 15 is a block diagram showing a conventional device.
Figure 16:
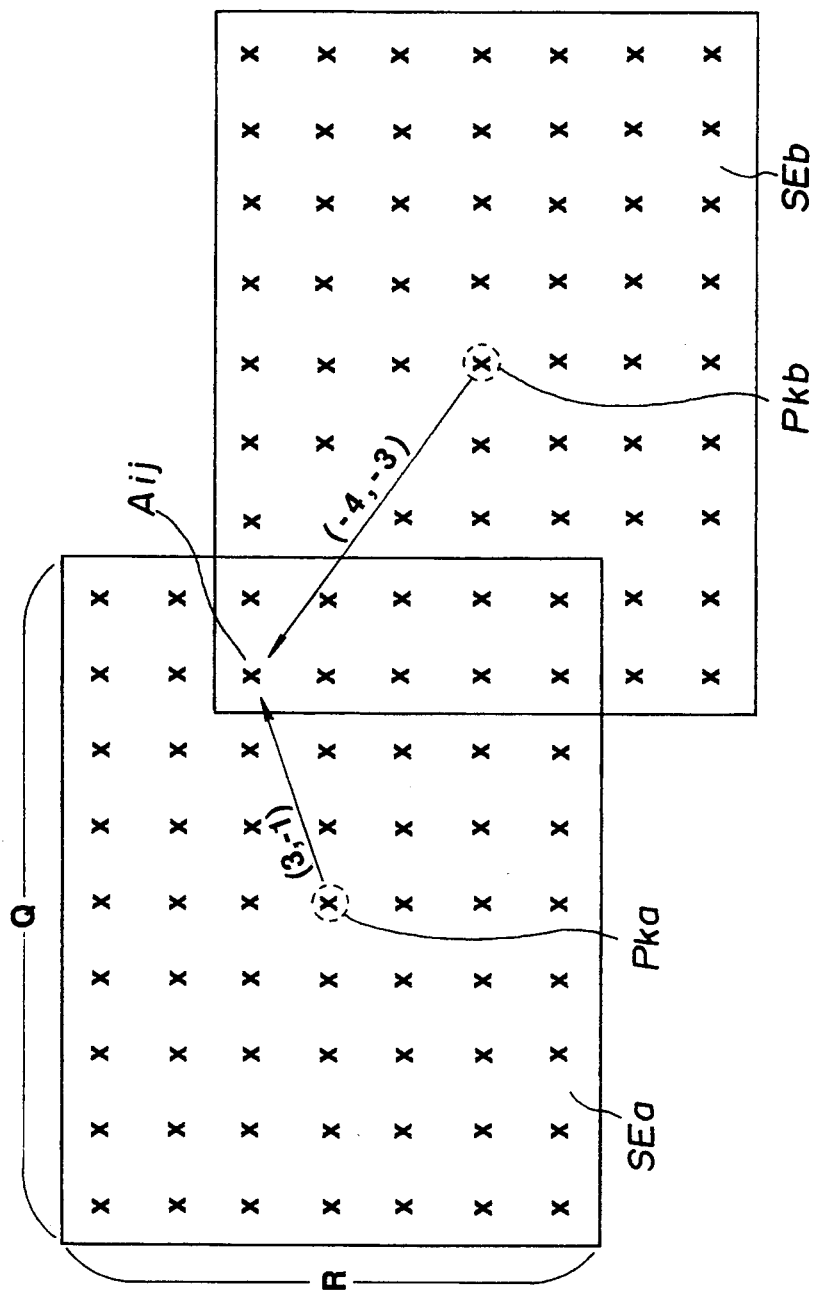
FIG. 16 shows overlapped search areas.
Figure 17:
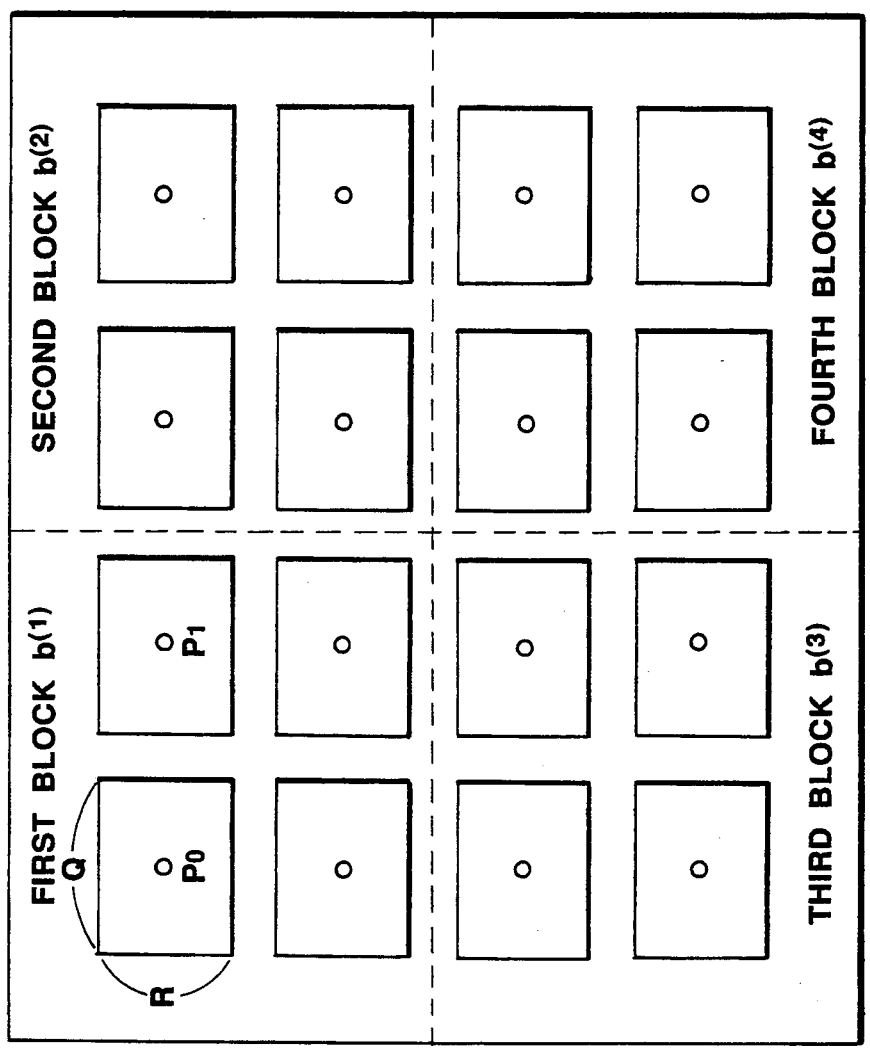
FIG. 17 shows blocks in the conventional device.

A raster is divided into four blocks $b^{[1]}$ to $b^{[4]}$, as shown in FIG. 13. In the present embodiment, the remainder is calculated for each block at pixel intervals of (2, 1) and the motion vector of each block is found by interpolation of the minimum values for the blocks and from the values of the remainders of the periphery.

That is, the remainder; $S(n,m)^{[1]}$, $S(n,m)^{[2]}$, $S(n,m)^{[3]}$, $S(n,m)^{[4]}$ for the first to fourth blocks $b^{[1]}$ to $b^{[4]}$ respectively, are found from data of the current field and from the representative points. Meanwhile, $n = -2, 0, 2, 4$ and $m = -2, -1, 0, 1, 2, 3$.

When data of the preceding field are entered at input terminal 1, data of the representative points Pki and $P_1$ki are stored in representative memory 2. Referring to FIG. 13, from time $T_0$ until time $T_1$, the intermediate results of the remainder $s(n, m)^{[1]}$ for the first block $b^{[1]}$ ($n = -2, 0, 2, 4$ and $m = -2, -1, 0, 1, 2, 3$) are stored in remainder memory 61, whilst data of the remainder $S(n, m)^{[2]}$ are stored in remainder memory 62. The remainder memories 61, 62 are of a capacity of Q×R/2 words.

Among data of the current field, data of the representative point Pki for the first block $b^{[1]}$ is read out from representative memory 2, and $|A0^{[1]} - Pk1^{[1]}|$, a partial term of the remainder $S(2, 1)^{[1]}$, is calculated by subtractor 3 and absolute value unit 4. Data of the intermediate result $s(2, 1)^{[1]}$ read from remainder memory 61 and $$s(2, 1)^{[1]} + |A0^{[1]} - Pk1^{[1]}|$$

is calculated in the adder 5. The results are newly set as an intermediate result $s(2, 1)^{[1]}$ for overwriting at an address of the remainder memory 61 where the old intermediate results were stored.

Similarly, if the representative point Pki is Pki ∈ second block $b^{[2]}$, data of the intermediate results are read from the remainder memory 62 and data of the new intermediate results are overwritten in the remainder memory 62.

If data of a pixel $A1^{[1]}$ of the first block $b^{[1]}$, among data of the current field, are entered at input terminal 1, data of the representative point $P_1k4^{[1]}$ is read from the representative memory 2, and $|A1^{[1]} - P_1k4^{[1]}|$, a partial term of the remainder $S(0, -2)^{[1]}$, is calculated by subtractor 3 and absolute value unit 4. Data of the intermediate results $s(0, -2)^{[1]}$ is read from remainder memory 61 and $$s(0, -2)^{[1]} + |A0^{[1]} - Pk4^{[1]}|$$

is calculated by adder 5 and the results are set as new intermediate results of the remainder for overwriting at an address of the remainder memory 61 where the old results of the remainder were stored.

Similarly, if the representative point $P_1$ki is $P_1$ki ∈ second block $b^{[2]}$, data of the intermediate results of the remainder are read from remainder memory 62 for overwriting as new intermediate results in the remainder memory 62.

By continuing the processing operation as described above, the intermediate results $s(n, m)^{[1]}$ stored in remainder memory 61 is the remainder $S(n, m)^{[1]}$ at a time $T_1$ when data of the first and second blocks $b^{[1]}$, $b^{[2]}$ are all entered from input terminal 1.

The data of the remainder $S(n, m)^{[1]}$ of the first block $b^{[1]}$ in the remainder memory 61 ($n = -2, 0, 2, 4$, $m = -2, -1, 0, 1, 2, 3$) are entered to the comparator interpolator circuit 7 to calculate a vector (n, m) which becomes the least vector in the comparator interpolator circuit 7 to find the motion vector of the first block $b^{[1]}$ by interpolation from the least point and the remainder of the vicinity.

The data of the remainder $S(n, m)^{[2]}$ of the second block $b^{[2]}$ in the remainder memory 62 ($n = -2, 0, 2, 4$, $m = -2, -1, 0, 1, 2, 3$) are entered to the comparator interpolator circuit 7 to find the motion vector of the second block $b^{[2]}$ in the similar manner.

At time $T_1$ to $T_2$, the remainder memories 61, 62 are used as remainder memories for the third and fourth blocks $b^{[3]}$, $b^{[4]}$, respectively. Since the intermediate results $s(n, m)^{[3]}$, $s(n, m)^{[4]}$ in the remainder memories 61, 62 at time $T_2$ are the remainders $S(n, m)^{[3]}$, $S(n, m)^{[4]}$, the motion vectors of the blocks $b^{[3]}$, $b^{[4]}$ are found in the comparator interpolator circuit 7 in the similar manner.

The motion vectors found in the above described manner at the first to fourth blocks $b^{[1]}$ to $b^{[4]}$ are sent to a decision circuit 8 where a decision is made in accordance with the following three conditions. That is, if, in the decision circuit 8, the four vectors of the four blocks $b^{[1]}$ to $b^{[4]}$ are all the same, as a first condition, the vector is output as a true motion vector. If, as a second condition, only the motion vector of one of the blocks differs from the motion vector of the other three blocks b, the motion vector of the three blocks b are output as a true motion vector. If, as a third condition, the above two conditions are not satisfied, it is deemed that the motion vector cannot be detected, so weighting coefficients are added to the blocks and a judgment is made on the basis of these weighting coefficients.

If, instead of the decision under the third condition, the above first and second conditions are not satisfied, as a fourth condition, the motion vector may be found for the entire raster, instead of on the block-by-block basis, as in the above described first embodiment.

In this case, however, the motion vector needs to be found for the entire raster, instead of for each block, in consideration of the decision to process under the fourth condition. Thus, in FIG. 12, an adder and a remainder memory having a capacity of Q×R/2 words are provided and the output of the absolute value memory 4 is cumulatively added for each vector for the entire raster with the aid of the adder and the remainder memory to find the remainder S(n, m) for the entire raster (n=−2, 0, 2, 4, m=−2, −1, 0, 1, 2, 3). The remainder S(n, m) is entered in a comparator interpolator circuit separate from the comparator interpolator circuit 7 to find the motion vector for the entire raster at the pixel interval of (1, 1). The motion vector thus found and the output of the comparator interpolator circuit 7 are input at the decision circuit 8.

In the present embodiment, the write/read addresses of the representative memory 2 and the remainder memories 61, 62 are controlled by a control circuit 85.

The interpolating method as described in connection with the first embodiment may also be employed.

If, in the present second embodiment, the motion vector of the pixel interval of (2, 1) suffices as an output, only a comparator may be used in place of the comparator interpolator circuit.

The raster may be divided in any smaller or larger blocks in place of four in the present embodiment.

In FIGS. 1 and 2, the remainder was found at the pixel interval of (2, 1) from the data of the current field and the representative points. In this case, up to 2 representative points can be taken for each $Q \times R$. The remainder memory of a capacity of $Q \times R/2$ words suffices.

In general terms, q representative points at the maximum can be taken per $Q \times R$, if the remainder is found at a pixel interval of (q, 1), while the remainder memory each of a capacity of $Q \times R/q$ words suffices. Also, if the remainder is found two-dimensionally at a pixel interval of (q, r), $q \times r$ representative points at the maximum can be taken per $Q \times R$ while the remainder memory of a capacity of $Q \times R/q \times r$, suffices, where q and r are integers.

In the present second embodiment, representative points $P_2ki$ as shown in FIG. 9 may be taken, as described previously. Q=8 and R=6 in FIG. 9 and the remainder found by the representative points and data of the current field are at intervals of a checkerboard pattern, as indicated by hatching shown in FIGS. 10 and 11. That is, 24 ($=Q \times R/2$) remainders $S(2n, 2m)^{[B]}$, $S(2n-1, 2m+1)^{[B]}$, (n=−1, 0, 1, 2, m=−1, 0, 1) are calculated from block to block and the motion vector of each vector is found by interpolation from the vector and the remainder in the vicinity of the vector at a pixel interval of (1, 1), or at a finer interval.

With the motion vector detection device of the present second embodiment, the remainder at $Q \times R/q \times r$, where $q \times r$ is an integer not less than 2, in which the interval in at least one of the vertical and horizontal directions is equal to two or more pixels, are calculated by arraying plural remainder memories in each block obtained by dividing the raster (one field) into plural blocks, and the motion vector of each block is found at a pixel interval of (1, 1), or at a finer interval, by interpolation from the least remainder and the values of the remainder in its vicinity. In this manner, the remainder memory 2 of a capacity of $Q \times R/q \times r$ words suffices, in comparison with the capacity of $Q \times R$ words of the conventional memory, while $q \times r$ representative points can be taken per $Q \times R$ in comparison with one per $Q \times R$ with the conventional device, to enable more accurate detection of the motion vector.

If the remainder is calculated for the entire raster as in the first embodiment, an image of a moving object, such as a man or a car, possibly present in, for example, the third block b[3], affects the calculation of the remainder to interfere with the calculation of the motion vector. However, in the second embodiment, in which the raster is divided into plural blocks, it becomes possible to carry out remainder calculation from block to block to assure more accurate calculation of the motion vector.

Meanwhile, if the motion vector detection device of the present embodiment is applied to an apparatus for compressing a moving image, the data volume may be diminished by finding the motion vector from block to block and by taking the difference of the image displaced by the motion vector from block to block. In this case, the output of the comparator interpolator circuit of FIG. 12 may be used as the motion vector on the block-by-block basis.

It is seen from the above that the present invention provides a motion vector detection device in which the absolute value of the difference between a plurality of sets of representative points selected at the same interval as the search area consisting of $Q \times R$ pixels and pixel data of the current field at the positions of the $q \times r$ pixel interval is calculated to find vectors, data of each vector are cumulatively summed to find the remainder, data of the remainder of each vector are compared to one another to find a motion vector and a motion vector is found at an interval less than $q \times r$ by interpolation of the motion vector and values of the remainder in its vicinity, so that the number of the representative points may be increased to elevate detection accuracy as well as to reduce detection errors.

The present invention also provides a motion vector detection device in which the raster of one field is divided into blocks, the absolute value of the difference between a plurality of sets of representative points selected at the same interval as the search area consisting of $Q \times R$ pixels and pixel data of the current field at the positions of the $q \times r$ pixel interval is calculated from block to block to find vectors, data of each vector are cumulatively summed to find remainder for each block, data of the remainder of each vector of each block are compared to one another from block to block to find a motion vector at the interval of $q \times r$ for each block, a motion vector is calculated at an interval less than $q \times r$ by interpolation from the motion vector and values of the remainder in its vicinity, and the true motion vector is determined on the basis of the motion vector for each block, for further improving motion vector detection accuracy.

What is claimed is:

1. A motion vector detection device comprising:
   a representative point memory for storing a plurality of sets of representative points selected at intervals smaller than $Q \times R$ pixels of a picture of a field preceding a current field by one or more fields;
   calculating means for calculating an absolute value corresponding to vector data from one of said representative points to a position of a pixel in said current field by using a difference between data of a selected representative point from said representative point memory and said pixel in said current field at a time when data of said current field are supplied, the current field pixel data being separated from said one of said representative points at a selected interval of $q \times r$ pixels in a search area consisting of $Q \times R$ pixels corresponding to said one of said representative points;
   cumulative addition means for cumulatively adding the absolute value of successive vector data from said calculating means to find a remainder;

a comparator interpolator circuit for comparing successive vector data of the remainder from said cumulative addition means to find a motion vector at said interval of $q \times r$ pixels and for selectively interpolating from the motion vector and the positions distant to a motion vector found at said interval of $q \times r$ pixels and a remainder of adjacent ones of said positions to calculate motion vectors at interval smaller than said interval of $q \times r$ pixels; and wherein said values of q and r are determined so as to calculate a difference absolute value between only one of a first representative point and a second representative point and data of one pixel, the first and second representative points having an overlapped area between search areas of each representative point and said pixel in the current field in said overlapped area of said search areas.

2. A motion vector detecting device as claimed in claim 1 wherein said calculating means comprises:

a subtractor for calculating the difference between data of a selected representative point at a time when data of the current field are supplied and data of selected pixels of the current field separated from said representative point by $q \times r$ pixels; and an absolute value unit receiving the difference from said subtractor for calculating the absolute value of said difference.

3. A motion vector detecting device as claimed in claim 1 wherein said cumulative addition means comprises:

an adder for adding said absolute value of the difference between data of a selected representative point at a time when data of the current field are supplied and data of selected pixels of the current field separated from said representative point by $q \times r$ pixels and remainder data stored in a remainder memory.

4. A motion vector detecting device as claimed in claim 3 wherein said comparator interpolator circuit compares successive vector remainder data stored in said remainder memory to find a vector that is least at the interval of $q \times r$ pixels, while selectively interpolating from values of the remainder at the least vector and the adjacent positions to calculate the motion vector at intervals smaller than $q \times r$ pixels.

5. A motion vector detecting device as claimed in claim 3, further comprising a control circuit for controlling write-readout and addresses of said representative point memory and said remainder memory.

6. A motion vector detection device comprising:

a representative point memory for storing a plurality of sets of representative points selected at intervals smaller than $Q \times R$ pixels of a picture of a field preceding a current field by one or more fields, each field being divided into a plurality of blocks;

calculating means for calculating an absolute value corresponding to vector data from one of said representative points to a position of a pixel of said current field using a difference between data of a selected representative point from said representative point memory and data of said pixel of said current field at a time when data of said current field are supplied, the current field pixel data corresponding to data separated from said selected representative point by an interval of $q \times r$ pixels in a search area consisting of $Q \times R$ pixels corresponding to said one of said representative points to find a block-by-block vector;

cumulative addition means for cumulatively adding said absolute value of block-by-block vector data from said calculating means to find a remainder;

a comparator interpolator circuit for comparing the block-by-block vector data of the remainder from said cumulative addition means and interpolating a motion vector at said interval of said $q \times r$ pixels from block to block and for selectively interpolating from the motion vector and the positions distant to a motion vector found at said interval of $q \times r$ pixels and a remainder of adjacent ones of said positions to calculate motion vectors at intervals smaller than $q \times r$ pixels;

a decision circuit for establishing a true motion vector based on data of the motion vector from block to block obtained by comparison and interpolation by said comparator interpolator circuit; and wherein the values of q and r are determined so as to calculate a difference absolute value between only one of a first representative point or a second representative point and one pixel data, the first and second representative points having an overlapped area between search areas of each representative point and said pixel in the current field in said overlapped area of said search areas.

7. A motion vector detecting device as claimed in claim 6 wherein said calculating means comprises:

a subtractor for calculating the difference between data of a selected representative point at a time when data of the current field are supplied and data of selected pixels of the current field separated from said representative point by $q \times r$ pixels; and an absolute value unit receiving the difference from said subtractor for calculating the absolute value of said difference.

8. A motion vector detecting device as claimed in claim 6 wherein said cumulative addition means comprises:

an adder for adding said absolute value of the difference between data of a selected representative point at a time when data of the current field are supplied and data of selected pixels of the current field separated from said representative point by $q \times r$ pixels and remainder data stored in a remainder memory.

9. A motion vector detecting device as claimed in claim 8 wherein a plurality of remainder memories are provided for selectively storing said remainder data based on an interval of said block.

10. A motion vector detecting device as claimed in claim 8 further comprising a control circuit for controlling the write-readout and addresses of said representative point memory and said remainder memory.

11. A motion vector detection device as claimed in any of claims 1 to 10 which is used for compensating for deviations caused by manual camera oscillations.

12. A motion vector detection device as claimed in any of claims 1 to 10 which is used for compressing moving pictures.

* * * * *